United States Patent [19]

Ghose et al.

[11] Patent Number: 4,486,757
[45] Date of Patent: Dec. 4, 1984

[54] AUTOMATIC DIRECTION FINDER

[75] Inventors: Rabindra N. Ghose, Los Angeles; Walter A. Sauter, Malibu; William L. Foley, Westlake Village, all of Calif.

[73] Assignee: American Nucleonics Corp., Westlake Village, Calif.

[21] Appl. No.: 314,521

[22] Filed: Oct. 26, 1981

[51] Int. Cl.³ ............................................. G01S 5/02
[52] U.S. Cl. ................................. 343/417; 343/443
[58] Field of Search ............. 343/113 R, 117 A, 119, 343/100 CL, 100 LE, 394, 417, 442, 443, 445

[56] References Cited
U.S. PATENT DOCUMENTS 3,369,235  2/1968  Odams et al. ................. 343/119
4,103,304  7/1978  Burnham et al. .............. 343/853
4,219,821  8/1980  Selim ............................. 343/727
4,275,397  6/1981  Gutleber ........................ 455/283

Primary Examiner—Theodore M. Blum
Attorney, Agent, or Firm—John E. Wagner

[57] ABSTRACT

This is an automatic direction finder comprising a separately located first and second sensor means for receiving a first and second representation signal from a remote electromagnetic signal source, an error correction loop means connected to the first and second sensor means for nulling the second representation signal in the second sensor means, and an indicator means responsive to the error correction loop means for computing and displaying an off-boresight direction of the electromagnetic signal when the second representation signal is substantially nulled at the second sensor means.

11 Claims, 2 Drawing Figures

AUTOMATIC DIRECTION FINDER

BACKGROUND OF THE INVENTION

In conventional interferometric radio direction finding systems, the phase difference between signals received by the two sensors is measured to determine the angle of arrival of the signal since, for a fixed separation distance between the two sensors, the phase difference is directly related to the angle to be measured. However, interferometric techniques to measure the angle of arrival of an RF signal have posed problems in implementation of the system and accuracy of the measurement. Traditionally, a long base line has been preferred to reduce the effect of noise and instrument error. However, a long baseline is not practical in mobile site applications, such as airplanes, where the physical parameters of the measurement site are severly limited.

Also, conventional interferometers even those having a long baseline are restricted in the use of the long baseline because the accuracy is greatly reduced by decorrelation of the signals at the two interferometric sensors due principally to the differences of scattering and multi-path propagation effects at the two sensors. In addition, conventional interferometers are also particularly frequency sensitive and suffer from limited resolution and phase ambiguity problems.

An alternate approach to determining the angle of arrival of a RF signal is to measure the time of arrival difference of the signal between the two sensors. This can be accomplished for any baseline length so long as the difference in arrival times can be accurately measured since, for a fixed baseline, the delay is a known function of the angle to be measured. The present invention has incorporated the differential time-delay concept by an adaptive loop, without actually measuring the delay.

Art known to the applicant in the area of interference cancellation systems for eliminating interference in radio receivers which employ an adaptive loop is found in U.S. Pat. No. 3,669,444 to the present co-inventor, R. N. Ghose. Since it is highly desirable to be able to simultaneously transmit and receive on a single frequency from adjacent antennas, it was necessary to develop a system which could cancel out the unwanted transmitter signal from the received signal and, hence, allow full duplex radio transmissions on a single frequency. The Ghose invention when connected to the radio receiver antenna will sense the interfering signal and generate a signal which is the negative compliment of the interfering signal. The negative compliment signal is added in the radio receiver antenna circuit to cancel out the interfering signal.

To assure that only the transmitter reference signal is cancelled out and the correction loop is not disturbed by stray signals from other sources which would cause the correction loop to operate incorrectly, the inventor created a stage which takes a sample of the signals delivered by the transmitter system to the receiver antenna. Then another stage exists to pass into the summing coupler the required cancellation signal obtained from the reference sample following appropriate adjustment of its amplitude ratio and its electrical phase angle as time delay.

Art known to the applicant disclosing signal controllers can be found in U.S. Pat. No. 4,016,516 to W. Sauter, and U.S. Pat. No. 3,648,176 to D. Martin. The signal controller disclosed in the aforementioned Sauter Patent uses PIN diodes and is designed to be inserted into an RF transmission line to control the signal amplitude ratio and polarity by an external DC voltage control means. It is embodiments of this reflective signal controller which are primarily used as signal controllers in the present invention. U.S. Pat. No. 3,648,176 discloses a signal controller to cancel out unwanted signals by employing an RF potientiometer directly coupled to a drive motor and a velocity generator whereby corrections in potientiometer may be made automatically by driving the motor in a feedback control loop.

Art known to the applicant disclosing the use of interferometric techniques is U.S. Pat. No. 3,716,863 to R. N. Ghose and W. A. Sauter for an instrument landing error correcting system. The Ghose et al invention is an automatic correcting system for Instrument Landing Systems (ILS) used as a landing aid for aircraft. It involves reduction or correction of the 90 or 150 Hz moduation output for the ILS receiver by radiating a correcting signal which when detected by the ILS receiver, nulls the dominant modulation error resulting from the building-reflected signal.

The foregoing art references do not give any directional information with respect to the signals received, therefore, the present invention is highly distinguishable from these references.

BRIEF STATEMENT OF THE INVENTION

The inventors have devised an automatic direction finding system which does not depend upon the frequency of the measured signal and does not require a long baseline for its accuracy. The invention is based upon the principle that angular measurement of an RF signal is feasible for any baseline length so long as one can accurately obtain an equivalent measure of the difference in arrival times of the signal at the two interferometric sensors. For a fixed baseline, the delay in arrival between the two sensors is a known function of the angle of the RF signal to the baseline; and, the accuracy of determination of the delay determines the accuracy of the angular measurement.

The system employs two separated sensors for receiving a distant source of radio transmission. The points where the two sensors are located define a baseline and a boresight which is a line perpendicular to the baseline and equidistant from the two sensor locations. The system also employs two signal controllers, one of which is fed an identical signal with a known delay of electrical phase angle or time. The two signal controllers produce an output that is adjustable in amplitude ratio and polarity from their fed signals. These output signals are summed and then subtracted from the signal received at the first sensor, producing a residual or error signal. Using the signal from the second sensor and its delayed counterpart as references, the error signals, following processing, are made to change the command signals which correct the parameters of the two signal controllers so that their summed output signal is identical in amplitude and 180 degrees out of phase with the signal received at the first sensor.

By measuring the command signals during periods when the summed output of the signal controllers and the signal from the first antenna are identical, individual computations of the angle off the boresight of the distant source of radio transmissions for a sequence of small time intervals can be had. The angle off the boresight can then be displayed or used in connection with other functions.

Since the accuracy of the system is dependent upon the readout accuracy of the delay in reception between the two sensors, the accuracy of angle measurements becomes independent of the modulations and frequency of the RF signal to be measured. Therefore, the limitations of traditional interferometric systems have been overcome by the present invention.

BRIEF DESCRIPTION OF THE DRAWINGS

This invention may be more clearly understood from the following detailed description and by reference to the drawing in which.

DETAILED DESCRIPTION OF THIS INVENTION

In its basic configuration, this invention is a passive system employing a pair of sensors receptive to RF signals in a common field.

Figure 1:
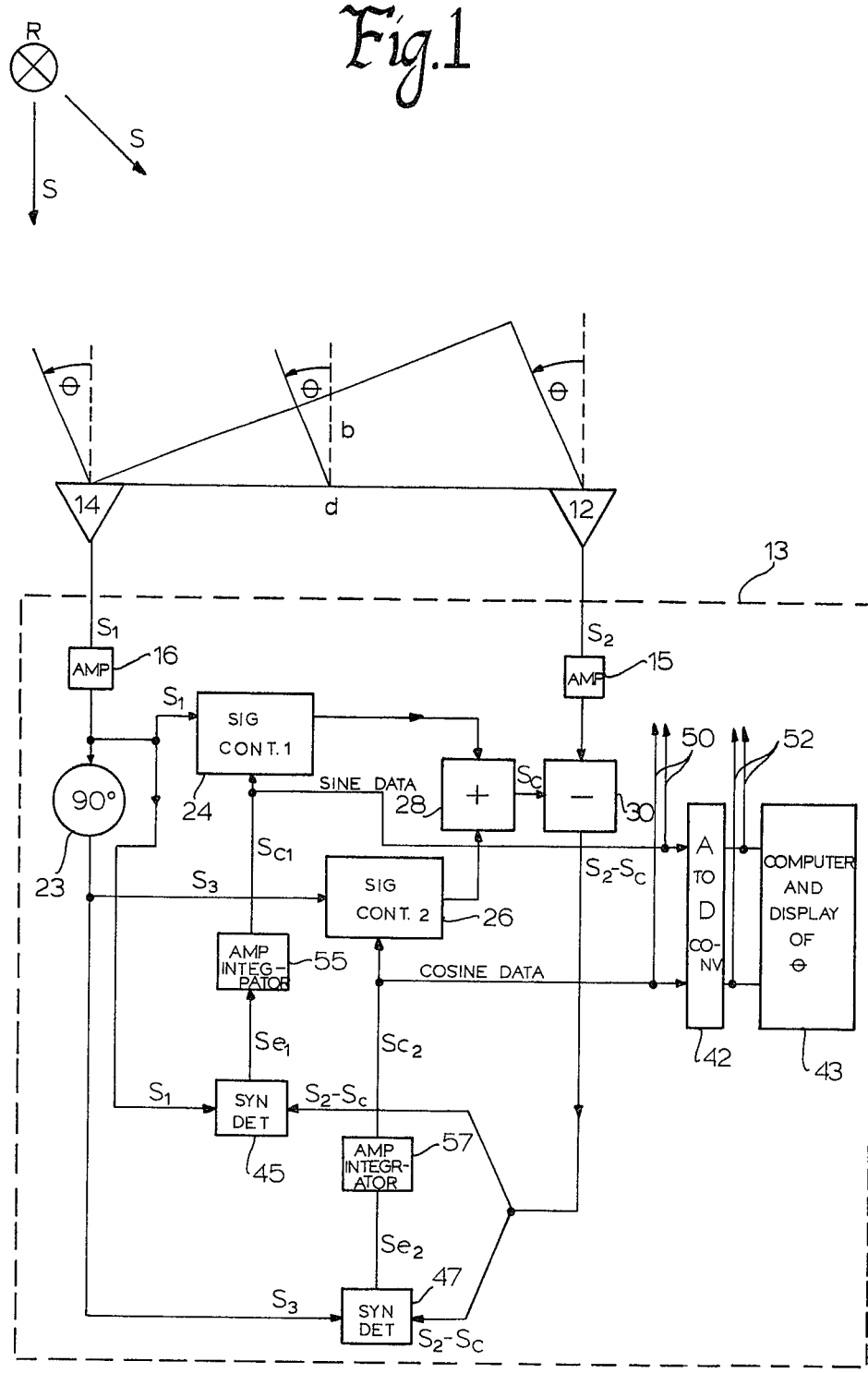
FIG. 1 is a block diagram of an automatic direction finder of this invention.

FIG. 1 shows a schematic block diagram of the automatic direction finding system 13 incorporating this invention. The signal S (which is for simplicity only a CW or near-CW type signal and the consequent phase adjustment instead of the time adjustment is assumed) from a distant radiating source R appear as a received signal $S_1$ and a received signal $S_2$ at the two sensors represented as antennas 14 and 12 respectively. The received signal $S_2$ received at the antenna 12 is delayed from the first received signal $S_1$ received at antenna 14 by a time represented by d sin $\theta$/v, where d is the baseline distance, $\theta$ is the off-boresight angle to be measured and v is the velocity of propagation of the electromagnetic wave in the medium. The boresight line b is perpendicular to the baseline d and equidistant from the two antennas 12 and 14.

For a sinusoidal radiating source with an angular frequency $\omega$, this delay corresponds to a phase given by $\beta$d sin$\theta$, where $\beta$ is the propagation constant equal to 2$\pi$/wavelength. For the electromagnetic signals received by the antennas 12 and 14, one may write:

$$S_1 = A \sin(\omega t - \beta r) \tag{1}$$

$$S_2 = \overline{A} \sin(\omega t - \beta r - \beta d \sin \theta) \tag{2}$$

$S_1$ is the signal received at antenna 14, A is the amplitude of the signal $S_1$, t is time and r is the radial distance from the source R to antenna 14, r+d sin $\theta$ is the radial distance from the source R to antenna 12, $S_2$ is the signal received at antenna 12 and $\overline{A}$ is the amplitude of signal $S_2$.

Signal $S_2$ is suitably amplified in amplifier stage 15 and introduced into a subtraction circuit 30. Signal $S_1$ is similarly amplified in amplifier stage 16, phase shifted by 90 degrees in the phase shifter 23 to provide a known phase delay of signal $S_3$ with respect to signal $S_1$. A first signal controller 24 and a second signal controller 26 introduce respectively a first and a second amplitude ratio factor $K_1$ and $K_2$ into the signals $S_1$ and $S_3$. These signal controllers 24 and 26 are preferrably of the type disclosed in U.S. Pat. No. 4,016,516. Since the signal $S_3$ to the second signal controller 26 is phase shifted by 90 degrees by the phase shifter 23 (or delay for a specific time), the composite signal $S_C$ formed from adding the amplitude adjusted signals outputted from the signal controllers 24 and 26 in the adder stage 28, can be expressed as:

$$S_c = K_1 A \sin(\omega t - \beta r) + K_2 A \cos(\omega t - \beta r) \tag{3}$$

$$= A\sqrt{K_1^2 + K_2^2} \sin(\omega t - \beta r + \tan^{-1} K_2/K_1) \tag{3A}$$

where $K_1$ is the first amplitude ratio factor and $K_2$ is the second amplitude ratio factor.

The output signal from the subtractor stage 30, $S_2 - S_c$, is applied to each of the two synchronous detectors 45 and 47. The synchronous detector 45 has applied to it the signal $S_1$ as a reference signal. An output error signal $S_{e1}$ will be detected and outputted from the synchronous detectors 45 when $S_2 - S_c$ is non-zero. This error signal $S_{e1}$ is then applied to the amplifier/integrator stage 55 which reacts to the error signal $S_{e1}$ and increases or decreases the appropriate command signal $S_{c1}$ to the first signal controller 24. Similarly, the synchronous detector 47 has applied to it the 90 degree phase-shifted signal $S_3$ and the output of the subtractor stage 30, $S_2 - S_c$. This synchronous detector is also responsible for detecting and applying the resultant error signal $S_{e2}$ to its amplifier/integrator stage 57 which increases or decreases the appropriate command signal $S_{c2}$ to the second signal controller 26.

The object of the first 24 and second 26 signal controllers is to be provided with values of the first and second amplitude ratio factors $K_1$ and $K_2$ such that the composite signal $S_c$ becomes identically equal in amplitude and phase to $S_2$, the signal received at antenna 12, so that when composite signal $S_c$ is subtracted from the first received signal $S_1$ in the subtractor stage 30, a null condition will result. The relationship of the amplitude correction factors may be expressed as:

$$\sqrt{K_1^2 + K_2^2} = \overline{A}/A \tag{4}$$

$$\tan^{-1}(K_2/K_1) = \beta d \sin\theta \tag{5}$$

$$\theta = \sin^{-1}[1/\beta d \tan^{-1}(K_2/K_1)] \tag{6}$$

Therefore, if one can measure the values of the first and second amplitude ratio factors, $K_1$ and $K_2$ respectively, used to null or cancel the received signal $S_1$ by the amplitude and phase adjusted composite signal $S_c$, one can obtain a measure of the off-boresight angle $\theta$.

The first and second amplitude ratio factors $K_1$ and $K_2$ cannot be measured easily. However, if the control characteristic of these factors with respect to the command signals $S_{c1}$ and $S_{c2}$ is known, one can measure the command signals $S_{c1}$ and $S_{c2}$ in place of the amplitude ratio factors to obtain a measure of the off-boresight angle $\theta$. Since the control characteristic of the first or second amplitude ratio factors $K_1$ and $K_2$ as a function of the command signals $S_{c1}$ and $S_{c2}$ is known, the command signals $S_{c1}$ and $S_{c2}$ measured at the nulled condition will be a direct measurement of the amplitude ratio factors $K_1$ and $K_2$ with an appropriate scaling factor. A 12 bit digital readout from an analog to digital converter 42 of the command signals $S_{c1}$ and $S_{c2}$ at the digital synthesizer and angular readout 43 will provide more than adequate resolution for most angular measurements systems. Also, analog versions of the command signals $S_{c1}$ and $S_{c2}$ for use in other systems may be tapped at the utilization leads 50. As well, digital versions of the command signals $S_{c1}$ and $S_{c2}$ for use in other systems may be tapped at utilization leads 52.

To find the off-boresight angle $\theta$ it must first be appreciated that during initial turn-on of the system and before an equilibrium has been reached, the composite signal $S_c$ will not be equal to received signal $S_1$. Hence, the difference $(S_2 - S_c)$ will be non-zero. Error signals $S_{e1}$ or $S_{e2}$ corresponding to a non-zero signal $S_2 - S_c$ can be detected in the synchronous detectors 45 and 47 using $S_1$ and its 90 degree phase-shifted complement, $S_3$, as references.

After appropriate filtering and amplification, the error signals $S_{e1}$ and $S_{e2}$ from the sychronous detectors 45 and 47, respectively, are applied to amplifier/integrator 55 and 57 which are used to set the proper command signals $S_{c1}$ and $S_{c2}$ for the first 24 and second 26 signal controllers, respectively. The command signal $S_{c1}$ increases or decreases as required to cause the first signal controller 24 to drive the in-phase component of the signal $S_2 - S_c$ to a null when $S_2 - S_c$ has an in-phase component. Similarly, the command signal $S_{c2}$ is altered by the amplifier/integrator 57 as required to drive the quadrature component of $S_2 - S_c$ to a null when $S_2 - S_c$ has a quadrature component.

In equilibrium, the command signals $S_{c1}$ and $S_{c2}$ hold their values. Their values will change only when the error signals $S_{e1}$ and $S_{e2}$ reappear because of a change in the direction of arrival of the signal S from the distant radiating source R. Therefore, since the system continuously indicates direction of arrival of the signal S from a distant radiating source R even when S is no longer being received, pulsed or intermittant reception of the RF signal S does not affect the monitored command signals $S_{c1}$ and $S_{c2}$ nor the accuracy of the indicated direction.

Figure 2:
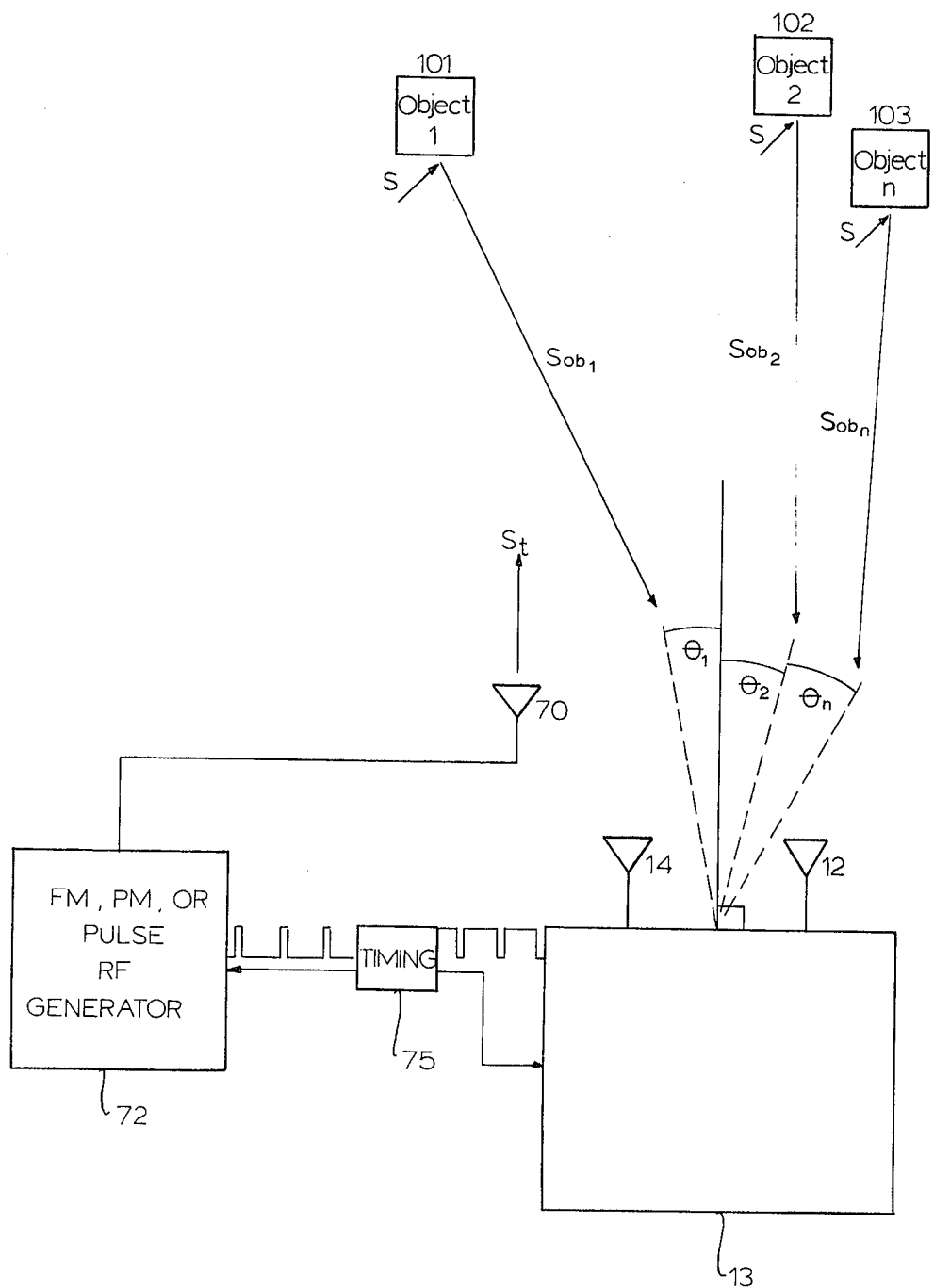
FIG. 2 is a block diagram of an alternate embodiment of the invention where the automatic direction finder is employed as a radar system.

Referring to FIG. 2, in an alternate embodiment of the invention, the automatic direction finder 13 of Figure 1 is used as an active transmitter radar system. To produce such a radar system, an FM, PM or pulsed RF generator 72, a radiating antenna 70, and filter or timing circuits 75 must be added to the automatic direction finder 13.

The RF generator 72 is typically turned on by pulses received from the timing circuit 75. For the short time intervals when the RF generator 72 is transmitting, the timing circuit 75 shuts the automatic direction finder 13 off. For a longer time interval, the RF generator 72 is turned off by the timing circuit 75 and the automatic direction finder 13 is turned on. This condition allows the automatic direction finder 13 to be unresponsive to signals $S_t$ from the RF generator 72 and allows time for one or more reflected signals $S_{ob1}$ through $S_{obn}$ to be received by the automatic direction finder 13.

The automatic direction finder 13 can then be used to determine the off-boresight angles $\theta_1$, $\theta_2$ or $\theta_n$ of the signals $S_{ob1}$, $S_{ob2}$ or $S_{obn}$ which reach the antennas 12 and 14. With time-share design, the first signal received would usually be computed and displayed first. Then the next of signal to be received at the antennas 12 and 14 of the automatic direction finder 13 will have its off-boresight angle determined, computed and displayed. Therefore, for any one pulse of the RF generator 72, a number of objects may have their off-boresight angles determined and updated.

The above-described embodiments are furnished as illustrative of the principles of this invention and are not intended to define the only embodiments possible in accordance with our teaching. Rather, protection under the United States Patent Law shall be afforded to use not only the specific embodiments shown but to those falling within the spirit and terms of the invention as defined by the following claims.

We claim:

1. An automatic direction finder for precise location of a source of electromagnetic signals comprising:

a first sensor means for receiving a first representation signal from an electromagnetic signal source; a second sensor means separately located from the first sensor means for receiving a second representation signal from the electromagnetic signal source;

the separately located first and second sensor means defining a baseline and boresight line which is a line perpendicular to the baseline and equidistant from the first and second sensor means;

an error correction means for producing a signal of equal amplitude and opposite phase from the second representation signal at the second sensor means;

said error correction means connected to the first and second sensor means for nulling the second representation signal at the second sensor means;

said error correcting means including means for deriving a control signal from the signal representation received by said first sensor means which constitutes a signal of equal amplitude and opposite phase from said second representation signal; and indicator means responsive to the error correction means for computing and displaying an off-boresight direction of the electromagnetic signal when the second representation signal is substantially nulled at the second sensor means.

2. The automatic direction finder in accordance with claim 1 in which the error correction loop means comprises:

a first signal controlling means responsive to the first representation signal and to a first command signal for producing a first resultant signal;

a means connected to the first sensor means for providing a phase-shifted first representation signal;

a second signal controlling means responsive to the phase-shifted first representation signal and to a second command signal for producing a second resultant signal which when added to the first resultant signal in the second sensor means produces a substantial null of the second representation signal;

means for adding the first and second resultant signals with the second representation signal in the second sensor means; and, means responsive to the first representation signal, the phase-shifted first representation signal and the second representation signal in the second sensor means for providing the first and second command signals which when applied to the first and second signal controlling means will cause the first and second resulting signals to substancially null the second representation signal in the second sensor means;

3. The automatic direction finder in accordance with claim 2 in which the indicator means comprises:

means for measuring the first and second command signals;

means for computing the off-boresight direction of the electromagnetic signal source from the first and second command signals.

4. The automatic direction finder in accordance with claim 3 in which the means for computing the off-boresight direction utilizes the equation $$\theta = \sin^{-1}[1/\beta d \tan^{-1}(K_2/K_1)],$$

$\theta$ is the off-boresight angle of the electromagnetic signal source, $\beta$ is a propagation constant equal to $2\pi$/wavelength, d is a baseline distance, $K_1$ is an amplitude ratio factor of the first signal controller, $K_2$ is an amplitude ratio factor of the second signal controller, and the first command signal is a function of $K_1$ and the second command signal is a function of $K_2$.

5. The automatic direction finder in accordance with claim 1 further including an illumination means for illuminating a plurality of objects with electromagnetic radiation and thus, by reflection off the objects, providing a source of the electromagnetic signal.

6. The automatic direction finder in accordance with claim 2 in which the means for providing a phase-shifted first representation signal phase-shifts the first signal by approximately 90 degrees.

7. A radio direction finder comprising:
a pair of spaced signal sensors both of which are responsive to signals at the same frequency;
means for phase shifting signals received by one of said pair of signal sensors by a fixed phase angle to provide a signal of known phase delay with respect to the signal received by the undelayed signal received by one of said pair of signal sensors;
means for deriving a pair of amplitude ratio signals of said undelayed and fixed phase angle delayed signals;
means for combining said undelayed and fixed phase delayed signals in amplitude ratios controlled by said pair of amplitude ratio signals to produce a signal of equal amplitude and opposite phase from the signal received by the second of said pair of sensors;
loop means for varying the amplitude ratio signals until the net difference in the signal at the second sensor and the signal of equal opposite phase is the smallest; and
means for displaying said amplitude ratio signals as an indication of angular deviation of a single signal source received by both of said sensors from a boresight line normal to the line between said sensors.

8. The combination in accordance with claim 7 wherein said deriving means comprise a pair of signal controllers, one receiving and controlling the amplitude of undelayed signals received by said first sensor and the second receiving and controlling the amplitude of said fixed delayed signals from said first sensor.

9. The combination in accordance with claim 7 wherein said combining means comprises an adder.

10. The combination in accordance with claim 7 wherein said loop means includes a subtractor stage.

11. The combination in accordance with claim 7 wherein said loop means includes synchronous detector means coupled to said subtractor stage and to said first sensor whereby an error signal indicative of the degree of nulling occurring in said subtractor stage is produced.

* * * * *